United States Patent [19]

Rabl et al.

[11] Patent Number: 4,922,107
[45] Date of Patent: May 1, 1990

[54] APPARATUS EMITTING AN ELECTROMAGNETIC RADIATION, IN PARTICULAR INFRARED, COMPRISING A PLANE SOURCE OF RAYS AND A REFLECTOR

[75] Inventors: Ari Rabl, Montgeron; Denis Clodic, Paris; Robert Dehausse, Joinville le Pont, all of France

[73] Assignee: A.R.M.I.N.E.S., Paris, France

[21] Appl. No.: 275,002

[22] Filed: Nov. 22, 1988

[30] Foreign Application Priority Data

Nov. 25, 1987 [FR] France .............................. 87 16361

[51] Int. Cl.⁵ .............................................. F21J 7/12
[52] U.S. Cl. .............................. 250/504 R; 250/505.1; 250/493.1; 350/628; 350/630
[58] Field of Search ............ 250/493.1, 504 R, 504 H, 250/494.1, 495.1, 505.1; 350/628, 630

[56] References Cited

U.S. PATENT DOCUMENTS

| Re. 17,038 | 7/1928 | Ballman | 353/98 |
|---|---|---|---|
| 3,449,561 | 6/1969 | Basil | 362/350 |
| 3,827,059 | 7/1974 | Rambauske | 350/620 |
| 3,923,381 | 12/1975 | Winston | 350/628 |
| 4,003,638 | 1/1977 | Winston | 350/628 |
| 4,066,887 | 3/1978 | Levis | 130/30 H |
| 4,114,592 | 9/1978 | Winston | 350/628 |
| 4,129,115 | 12/1978 | Wyatt | 350/628 |
| 4,130,107 | 12/1978 | Rabl et al. | 350/628 |
| 4,327,969 | 5/1982 | Giutronich et al. | 350/630 |
| 4,596,935 | 6/1986 | Lumpp | 250/504 R |

FOREIGN PATENT DOCUMENTS 1110073  4/1968  United Kingdom .

Primary Examiner—Jack I. Berman
Attorney, Agent, or Firm—McAulay Fisher Nissen & Goldberg

[57] ABSTRACT

This invention relates to an apparatus emitting infrared radiation which comprises a plane source of infrared rays and a reflector. In order to avoid the problem due to captive rays and to multiple reflections, the cross section of each half-reflector located on one side of the plane of symmetry has the form of an arc of ellipse whose two foci are respectively constituted by the first end of the plane source and the first end of the target which are both located on the other side of the plane of symmetry, this arc of ellipse extending between the second end of the plane source and the point of intersection of the ellipse with the direct ray going from the first end of the plane source to the second end of the target.

9 Claims, 1 Drawing Sheet

APPARATUS EMITTING AN ELECTROMAGNETIC RADIATION, IN PARTICULAR INFRARED, COMPRISING A PLANE SOURCE OF RAYS AND A REFLECTOR

FIELD OF THE INVENTION

The present invention relates to an apparatus emitting an electromagnetic radiation, in particular infrared, comprising a plane source of rays and a reflector.

BACKGROUND OF THE INVENTION

In an apparatus emitting electromagnetic radiation, particularly infrared, the reflector must be shaped and mounted, with respect to the source of rays, so that there are no rays captive between the source of rays and the reflector. In fact, such captive rays are the cause of a loss of yield and of local excess heating. In addition, the shape and arrangement of the reflector must enable it to eliminate the multiple reflections between source and reflector, which are naturally detrimental to the yield obtained with the apparatus.

Radiation, and particularly light radiation emitting apparatus are already known, as described for example in U.S. Pat. No. Re. 17,038, U.S. Pat. No. 4,066,887 and GB-A-No. 1 110 073. In the first two documents, the source of radiation is punctual and it is associated with a reflector which is generally in the form of a paraboloid. Patent GB-A-No. 1 110 073 relates to a reflector for a rectilinear infrared ray source, whose half cross section comprises two arcs of parabola joined together by an arc of circle centred on the source of the rays. However, the solutions adopted in all these known apparatus in no way avoid the above-mentioned problems when the source of radiation is plane.

The present invention relates to an apparatus which makes it possible to satisfy these conditions and to obtain a particularly high yield, with a remarkably simple structure.

SUMMARY OF THE INVENTION

To that end, this apparatus emitting an electromagnetic radiation, particularly infrared, comprising a plane source of rays and a reflector for reflecting these rays emitted in the direction of a target defined as extending between two ends, the source, the reflector and the target being symmetrical with respect to the same plane of symmetry of the emitter apparatus, so that the reflector is constituted by two halves of the same cross section located on either side of the plane of symmetry and that the plane source, perpendicular to the plane of symmetry, comprises first and second ends located on either side of this plane, is characterized in that the cross section of each half-reflector, located on one side of the plane of symmetry, has the form of an arc of ellipse of which the two foci are constituted respectively by the first end of the plane source and the first end of the target which are both located on the other side of the plane of symmetry, this arc of ellipse extending between the second end of the plane source located on the first side of the plane of symmetry or a point located in the immediate proximity of this second end and the point of intersection of the ellipse with the direct ray going from the first end of the plane source to the second end of the target.

BRIEF DESCRIPTION OF THE DRAWINGS

The invention will be more readily understood on reading the following description with reference to the accompanying drawings, in which.

DETAILED DESCRIPTION OF THE DRAWINGS

Figure 1:
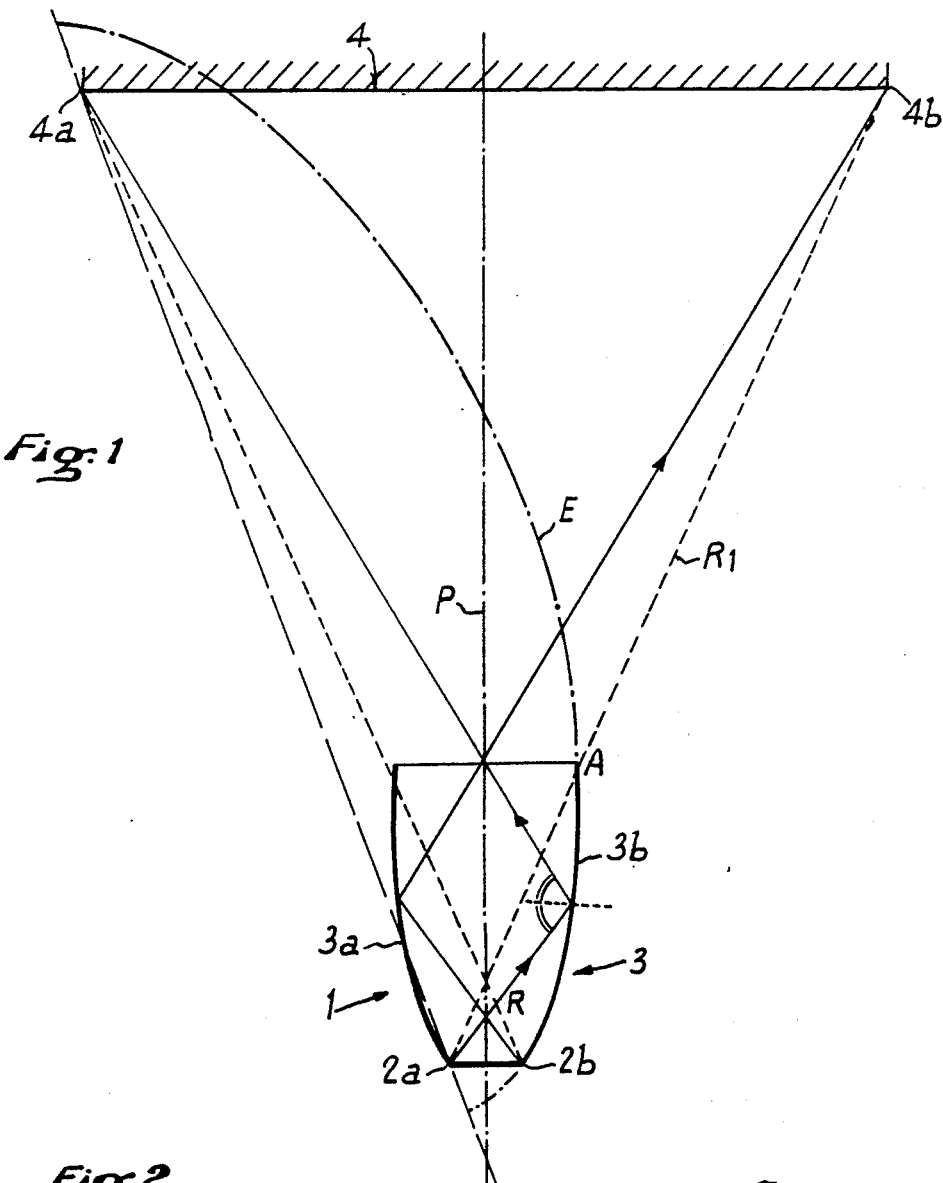
FIG. 1 is a diagram of an apparatus according to the invention for emitting infrared radiation.

Referring now to the drawings, the apparatus according to the invention for emitting radiation is generally designated by reference 1 in FIG. 1. This apparatus may emit any type of electromagnetic radiation, particularly light or infrared. However, in the following description, the apparatus will be considered, by way of non-limiting example, as emitting an infrared radiation. This apparatus comprises a plane source of infrared rays 2, constituting a rectangular radiant panel, which is perpendicular to a plane P which constitutes a plane of symmetry for the whole of apparatus 1, this plane P being perpendicular to the sheet of the drawing. The plane source 2 is defined as extending between two ends 2a and 2b which are symmetrical to each other with respect to plane P. The infrared radiation emitting apparatus also comprises a reflector 3 which is adapted to return the rays emitted by the source 2 onto a target 4 which, for simplification purposes, is considered as being a plane in FIG. 1 and extending perpendicularly to the plane of symmetry P of the emitter apparatus 1. This target 4 extends between two ends 4a, 4b, symmetrical to one another with respect to plane P, the first end 4a being located, with respect to plane P, towards the first end 2a of the source 2, whilst the second end 4b of the target 4 lies on the opposite side, in the same way as the second end 2b of source 2.

The reflector 3 is constituted by two cylindrical halves symmetrical with respect to plane P, namely a left half 3a and a right half 3b. Each half reflector has a cross section which is constituted, in the case of the right-hand half-reflector 3b, by an arc of an ellipse E having for foci the first ends 2a of the plane source 2 and 4a of the target 4 and passing through the second end 2b of the plane source 2. The right-hand half-reflector 3b extends between the second end 2b of the plane source 2 and a point A located at the intersection of the ellipse E and the extreme direct ray R1 which extends between the first end 2a of the plane source and the second end 4b of the target 4.

Thanks to the particular shape of the cross section of each half 3a, 3b of the reflector 3, each ray issuing from any point of the plane source 2 is reflected by the reflector 3 in the direction of the target 4 without there being a multiple reflection of any rays or a ray captive between the source 2 and the reflector 3. For example, FIG. 1 shows that the rays R issuing from the first end 2a or left-hand end of the source 2 directly attain the target 4 or are reflected by the right-hand half-reflector 3b, in the direction of the first end 4a of the target 4, without being intercepted by the left-hand half-reflector 3b. The same applies, of course, for all the rays issuing from the second end or right-hand end 2b of the source 2, which directly attain the target 4 or are reflected by the left-hand half-reflector 3b in the direction of the right-hand end of the target 4.

Figure 2:
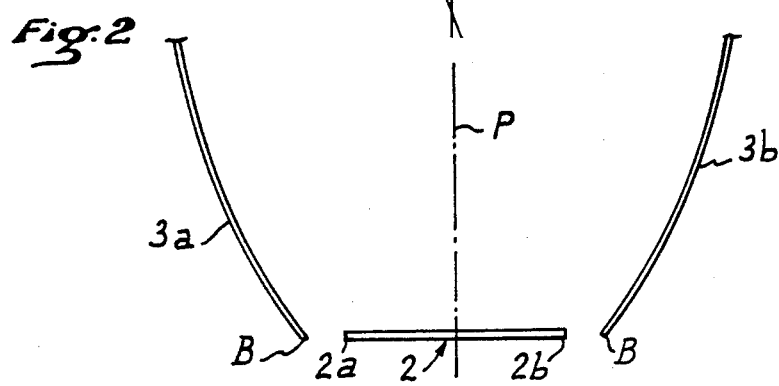
FIG. 2 is a diagram of a variant embodiment.

In the variant embodiment of the invention shown in FIG. 2, the two half-reflectors 3a and 3b are not joined directly to the two ends 2a, 2b of the source 2 and they terminate at points B which are located at a short distance from ends 2a, 2b of the source 2. In this way, openings are determined between the ends 2a, 2b of the source 2 and points B, which allow admission of air to ensure internal cooling of the apparatus 1.

The radiation emitter apparatus according to the invention may be used in the whole visible and invisible spectrum and it may in particular constitute a light beam projector, mounted, for example, on an automobile vehicle.

What is claimed is:

1. In an apparatus emitting infrared radiation, comprising a plane source of infrared rays and a reflector for reflecting these infrared rays emitting in the direction of a target defined as extending between two ends, the source, the reflector and the target being symmetrical with respect to the same plane of symmetry of the emitter apparatus, so that the reflector is constituted by two halves of the same cross section located on either side of the plane of symmetry and that the plane source, perpendicular to the plane of symmetry, comprises first and second ends located on either side of this plane, the cross section of each half-reflector, located on one side of the plane of symmetry, has the form of an arc of ellipse of which the two foci are constituted respectively by the first end of the plane source and a first end of the target which are both located on the other side of the plane of symmetry, this arc of ellipse extending between the second end of the plane source located on the first side of the plane of symmetry or a point located in the immediate proximity of this second end and the point of intersection of the ellipse with the direct ray going from the first end of the plane source to a second end of the target.

2. In the apparatus as claimed in claim 1, wherein said reflector includes a left half reflector and a right half reflector.

3. In the apparatus as claimed in claim 2, wherein said left half reflector and said right half reflector are free of any connection with said source.

4. In the apparatus as claimed in claim 2, wherein each of said left half reflector and said right half reflector is spaced from an end of said plane source to define an opening between said left half reflector and said plane source and said right half reflector and said plane source for allowing admission of air to the apparatus to ensure internal cooling thereof.

5. In the apparatus as claimed in claim 2, wherein said left half reflector and said right half reflector are connected with said plane source.

6. In the apparatus as claimed in claim 1, wherein said plane source is a rectangular radiant panel.

7. In the apparatus as claimed in claim 4, wherein said plane source is a rectangular radiant panel.

8. In the apparatus as claimed in claim 5, wherein said plane source is a rectangular radiant panel.

9. In the apparatus as claimed in claim 2, wherein said plane source is a rectangular radiant panel.

* * * * *